US010634213B2

(12) United States Patent
Nakashima et al.

(10) Patent No.: US 10,634,213 B2
(45) Date of Patent: Apr. 28, 2020

(54) SEALING STRUCTURE WITH DAMPER AND OIL SEAL

(71) Applicant: NOK CORPORATION, Tokyo (JP)

(72) Inventors: Toru Nakashima, Tottori (JP); Hiroyuki Uekusa, Tottori (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/171,792

(22) Filed: Oct. 26, 2018

(65) Prior Publication Data
US 2019/0063546 A1 Feb. 28, 2019

Related U.S. Application Data

(63) Continuation of application No. PCT/JP2017/016286, filed on Apr. 25, 2017.

(30) Foreign Application Priority Data

Apr. 27, 2016 (JP) .................................. 2016-089508
May 9, 2016 (JP) .................................. 2016-093737

(51) Int. Cl.
F16J 15/447 (2006.01)
F16F 15/126 (2006.01)
(Continued)

(52) U.S. Cl.
CPC ............ F16F 15/126 (2013.01); F16F 15/12 (2013.01); F16F 15/1442 (2013.01); F16J 15/447 (2013.01); F16F 2230/30 (2013.01)

(58) Field of Classification Search
CPC ........ F16F 15/126; F16F 15/12; F16J 15/447; F16J 15/4472; F16J 15/4474; F16J 15/4476; F16J 15/4478
See application file for complete search history.

(56) References Cited

U.S. PATENT DOCUMENTS 4,293,136 A * 10/1981 George ............... F16F 15/1442
277/565
5,649,710 A * 7/1997 Kanda .................. F16J 15/3256
277/371

(Continued)

FOREIGN PATENT DOCUMENTS

CN 1934379 A 3/2007
CN 101883941 A 11/2010
(Continued)

OTHER PUBLICATIONS

International Search Report for corresponding International Application No. PCT/JP2017/016286 dated Aug. 1, 2017.
(Continued)

Primary Examiner — Gilbert Y Lee
(74) Attorney, Agent, or Firm — Pearne & Gordon LLP

(57) ABSTRACT

A sealing structure includes a hub, an outer-periphery-side mass body, an outer-periphery-side damper elastic body, an inner-periphery-side mass body, and an inner-periphery-side damper elastic body. The hub is attached to one end of a rotary shaft of an object to be attached. The oil seal includes a seal lip in an annular shape and a side lip in an annular shape and is oriented to the inner-periphery-side mass body, is attached in a through hole in the object to be attached, and hermetically seals a void between the hub and the object to be attached. The inner-periphery-side mass body forms at least a part of a pocket which is composed of a recessed portion in an annular shape, and the side lip forms a labyrinth seal which is composed of a gap in an annular shape between the side lip and the pocket.

4 Claims, 9 Drawing Sheets

(51) Int. Cl.
*F16F 15/12* (2006.01)
*F16F 15/14* (2006.01)

(56) References Cited

U.S. PATENT DOCUMENTS

| | | | | |
|---|---|---|---|---|
| 6,145,842 | A | * | 11/2000 | Zellers .................... F16H 41/30 |
| | | | | 277/394 |
| 6,196,551 | B1 | * | 3/2001 | Zellers ................. F16J 15/3204 |
| | | | | 277/402 |
| 8,905,641 | B2 | | 12/2014 | Duch et al. |
| 2007/0187901 | A1 | | 8/2007 | Matsui |
| 2010/0259014 | A1 | | 10/2010 | Nakagawa |
| 2011/0221140 | A1 | | 9/2011 | Nakagawa |
| 2015/0072818 | A1 | * | 3/2015 | Lee ......................... F16F 15/14 |
| | | | | 474/166 |
| 2017/0234398 | A1 | * | 8/2017 | Kamiya ................ F16F 15/126 |
| | | | | 277/562 |
| 2017/0284547 | A1 | * | 10/2017 | Komyo ................. F16F 15/126 |
| 2018/0223949 | A1 | | 8/2018 | Kamiya et al. |

FOREIGN PATENT DOCUMENTS

| | | | |
|---|---|---|---|
| CN | 103335106 A | 10/2013 | |
| EP | 2 685 118 A | 1/2014 | |
| JP | S63-196867 U | 12/1988 | |
| JP | 07-010582 U | 2/1995 | |
| JP | 2011-089558 A | 5/2011 | |
| JP | 2011-220389 A | 11/2011 | |
| JP | 2011-241891 A | 12/2011 | |
| WO | 2016/027695 A1 | 2/2016 | |
| WO | WO-2016111129 A1 * | 7/2016 | ............ F16F 15/126 |

OTHER PUBLICATIONS

Written Opinion for corresponding International Application No. PCT/JP2017/016286 dated Aug. 1, 2017.
Decision to Grant in corresponding Japanese Application No. 2017-550657 and English translation.
English Translation of Written Opinion for corresponding International Application No. PCT/JP2017/016286 dated Aug. 1, 2017.
International Preliminary Report on Patentability for corresponding International Application No. PCT/JP2017/016286 dated Oct. 30, 2018.
Chinese Office Action dated Mar. 8, 2019 for corresponding Chinese Application No. 201780026569.7.
Extended European Search Report dated Dec. 19, 2019 for corresponding European Application No. 17789499.5.

* cited by examiner

SEALING STRUCTURE WITH DAMPER AND OIL SEAL

CROSS REFERENCE TO RELATED APPLICATIONS

This is a continuation application of International Patent Application No. PCT/JP2017/0016286 filed Apr. 25, 2017, which claims the benefit of Japanese Patent Applications No. 2016-089508 filed Apr. 27, 2016, and 2016-093737 filed May 9, 2016, the full contents of both of which are hereby incorporated by reference in their entirety.

BACKGROUND

The present disclosure relates to a sealing structure with a damper and an oil seal, and particularly relates to a sealing structure formed of a torsional damper for absorbing torsional vibrations and the like generated at a rotary shaft (crankshaft) of an engine in a vehicle or the like and an oil seal for the torsional damper.

BACKGROUND

In a conventional vehicle engine, a torsional damper which reduces torsional vibrations induced by rotational fluctuations of a crankshaft is attached to one end of the crankshaft.

Generally, a torsional damper is used as a damper pulley in an engine of a vehicle and transmits a portion of power from the engine to an auxiliary machine, such as a water pump or an air-conditioner compressor, via a belt for power transmission. A space between the torsional damper and, for example, a through hole in a front cover, through which a crankshaft is inserted, is sealed with an oil seal.

FIG. 7 is a partial sectional view in cross-section along an axis for schematically showing a sealing structure which is used in an engine of a vehicle and uses a conventional damper pulley 100 of a single-mass type and an oil seal 110. As shown in FIG. 7, the conventional damper pulley 100 includes a hub 101 in an annular shape which is made of metal, a pulley 102 which functions as a damper mass, and a damper elastic body 103 which is disposed between the hub 101 and the pulley 102.

The hub 101 includes a boss portion 101a on an inner periphery side, a rim portion 101b on an outer periphery side, and a disk portion 101c which connects the boss portion 101a and the rim portion 101b. The boss portion 101a of the hub 101 is fitted on a stepped portion at one end of a crankshaft 120 and is fixed with a bolt 121. A plurality of window portions 101d which are each composed of a through hole extending through the disk portion 101c are formed in a circumferential direction in the disk portion 101c in order to reduce weight.

The boss portion 101a of the hub 101 attached to the crankshaft 120 is in a state of being inserted through a through hole 123 in a front cover 122 of the engine from outside the engine.

The oil seal 110 is press fitted in the through hole 123 between the boss portion 101a and the front cover 122. A seal lip 111 of the oil seal 110 abuts slidably and liquid-tightly on an outer peripheral surface of the boss portion 101a and hermetically seals a void between the damper pulley 100 and the front cover 122.

FIG. 8 is a partial sectional view in cross-section along an axis for schematically showing a sealing structure with a conventional damper pulley 200 of a double-mass type and an oil seal 210. As shown in FIG. 8, the damper pulley 200 of the double-mass type is generally used for the purpose of reducing torsional vibrations induced by rotational fluctuations of a crankshaft 220 to a greater degree than the single-mass type.

In the damper pulley 200, sleeves 202 and 203 in annular shapes which are made of sheet metal are attached to fit on an inner periphery side and an outer periphery side, respectively, of a rim portion 201b of a hub 201 in an annular shape which is made of metal. Metal mass bodies 206 and 207 are attached to the sleeves 202 and 203 via rubber-like elastic bodies 204 and 205 in annular shapes, respectively.

In this case, the mass body 206 functions as an inner mass, and the mass body 207 functions as an outer mass. That is, the damper pulley 200 has a double-mass structure with the mass body 206 as the inner mass and the mass body 207 as the outer mass. The rubber-like elastic bodies 204 and 205 are vulcanized and bonded to the sleeves 202 and 203 and the mass bodies 206 and 207 concurrently with molding of the rubber-like elastic bodies 204 and 205.

The oil seal 210 is press fitted in a through hole 233 between a boss portion 201a of the hub 201 and a front cover 230. A seal lip 211 of the oil seal 210 abuts slidably and liquid-tightly on an outer peripheral surface of the boss portion 201a and hermetically seals a void between the damper pulley 200 and the front cover 230 (see, for example, Japanese Utility Model Application Publication No. 07-10582).

FIG. 9 is a partial sectional view in cross-section along an axis for schematically showing a sealing structure which is used in an engine of a vehicle and uses a conventional damper pulley 1100 of a single-mass type and an oil seal 1110. As shown in FIG. 9, the conventional damper pulley 1100 includes a hub 1101 in an annular shape which is made of metal, a pulley 1102 which functions as a damper mass, and a damper elastic body 1103 which is disposed between the hub 1101 and the pulley 1102.

The hub 1101 includes a boss portion 1101a on an inner periphery side, a rim portion 1101b on an outer periphery side, and a disk portion 1101c which connects the boss portion 1101a and the rim portion 1101b. The boss portion 1101a is fitted on one end of a crankshaft 1120 and is fixed with a bolt 1121.

The disk portion 1101c has a cylinder portion 1101d in a cylindrical shape which protrudes toward an outer side (a direction opposite to a direction toward a front cover 1122 of the engine) of the hub 1101 and is centered about an axis x, a hub-side projecting portion 1101p in an annular shape which protrudes toward the front cover 1122 and is centered about the axis x, and a recessed portion 1101e in a generally U-shape in cross-section which is formed to face the front cover 1122.

The boss portion 1101a of the hub 1101 attached to the crankshaft 1120 is in a state of being inserted through a through hole 1123 in the front cover 1122 from outside the engine.

The oil seal 1110 is press fitted in the through hole 1123 between the boss portion 1101a and the front cover 1122. A seal lip 1111 of the oil seal 1110 abuts slidably and liquid-tightly on an outer peripheral surface of the boss portion 1101a and hermetically seals a void between the damper pulley 1100 and the front cover 1122.

The front cover 1122 is arranged at a position spaced apart by a predetermined distance from the damper pulley 1100. A cover-side projecting portion 1122p in an annular shape which protrudes toward the hub 1101 and is centered about the axis x is formed at a portion of the front cover 1122 which faces the recessed portion 1101e of the hub 1101.

That is, the cover-side projecting portion 1122p is in a state of being arranged on the inner periphery side closer to the axis x than the hub-side projecting portion 1101p of the hub 1101, and the cover-side projecting portion 1122p is in a state of being inside the recessed portion 1101e of the hub 1101.

In this case, the hub-side projecting portion 1101p of the hub 1101 and the cover-side projecting portion 1122p of the front cover 1122 overlap spatially in a radial direction to form a labyrinth seal. By means of the labyrinth seal structure, the sealing structure with the damper pulley 1100 and the oil seal 1110 complicates a route of entry of dust from the outside as a measure to inhibit entry of such dust (see, for example, Japanese Patent Application Publication No. 2011-241891).

Disclosure

However, in the case of each of the damper pulley 100 of the single-mass type and the damper pulleys 200 of the double-mass type, if a foreign substance enters between the oil seal 110 or 210 and the outer peripheral surface of the boss portion 101a or 201a, the seal lip 111 or 211 may bite into the foreign substance and be damaged or deteriorate, which may lower the sealing capability of the oil seal 110 or 210, thereby causing oil to leak out from the engine.

The above-described sealing structure with the damper pulley 1100 of the single-mass type and the oil seal 1110 has a significant increase in weight compared to a case without a labyrinth structure due to the presence of both the hub-side projecting portion 1101p provided at the damper pulley 1100 and the cover-side projecting portion 1122p provided at the front cover 1122.

The present disclosure is related to providing a sealing structure with a damper and an oil seal capable of further improving a function of inhibiting entry of a foreign substance by inhibiting a seal lip of the oil seal from being subjected to the foreign substance entering from the damper while reducing overall weight.

SUMMARY

According to an aspect of the present disclosure, there is provided a sealing structure (1) using a damper (10) and an oil seal (20), characterized in that the damper (10) includes a hub (11), an outer-periphery-side mass body (12) in an annular shape which is provided on an outer periphery side of the hub (11) and is centered about an axis (x), an outer-periphery-side damper elastic body (13) which is disposed between the hub (11) and the outer-periphery-side mass body (12) and elastically connects the hub (11) and the outer-periphery-side mass body (12), an inner-periphery-side mass body (14) in an annular shape which is provided on an inner periphery side of the hub (11) and is centered about the axis (x), and an inner-periphery-side damper elastic body (15) which is disposed between the hub (11) and the inner-periphery-side mass body (14) and elastically connects the hub (11) and the inner-periphery-side mass body (14), the damper (10) is attached to one end of a rotary shaft (51) of an object (53) to be attached in a state in which the hub (11) is inserted through a through hole (54) in the object (53) to be attached, the oil seal (20) is attached in the through hole (54) in the object (53) to be attached in a state of including a seal lip (24) in an annular shape which is centered about the axis (x) and a side lip (29) in an annular shape which is centered about the axis (x) and is oriented to the inner-periphery-side mass body (14) and creates a seal between the hub (11) and the object (53) to be attached, the hub (11) includes a boss portion (11a) in an annular shape which is centered about the axis (x), a rim portion (11b) in an annular shape which is located on the outer periphery side of the boss portion (11a) and is centered about the axis (x), and a disk portion (11e, 11d, or 11c) in a disk shape which connects the boss portion (11a) and the rim portion (11b) and is centered about the axis (x), the outer-periphery-side mass body (12) is attached to an outer peripheral surface (11bg) of the rim portion (11b) via the outer-periphery-side damper elastic body (13), the inner-periphery-side mass body (14) is attached to an inner peripheral surface (11bn) of the rim portion (11b) via the inner-periphery-side damper elastic body (15), the inner-periphery-side mass body (14) forms at least a part or a whole of a pocket (P1) which is composed of a recessed portion in an annular shape centered about the axis (x), and the seal lip (24) of the oil seal (20) slides on the boss portion (11a), and the side lip (29) of the oil seal (20) extends toward the pocket (P1) to form a labyrinth seal which is composed of a gap (g2) in an annular shape between the side lip (29) and the pocket (P1).

The pocket (P1) of the inner-periphery-side mass body (14) is defined by two surfaces (14u, 14y) of the inner-periphery-side mass body (14) and an outer peripheral surface (11ag) of the boss portion (11a).

The pocket (P2) is defined by one surface (14sn) of the inner-periphery-side mass body (14), an outer peripheral surface (11ag) of the boss portion (11a), and a side surface (11ci) of the disk portion (11c).

The pocket (P1 to P3) and the side lip (29) of the oil seal (20) overlap spatially with each other.

According to an aspect of the present disclosure, there is provided a sealing structure (1000) using a damper (1010) and an oil seal (1020), characterized in that the damper (1010) includes a hub (1011), a sheet metal member (1015) in an annular shape which is fixed integrally with the hub (1011) on an inner periphery side of the hub (1011), a mass body (1014) in an annular shape which is attached to the sheet metal member (1015) and is centered about an axis (x), and a damper elastic body (1016) which is disposed between the sheet metal member (1015) and the mass body (1014) and elastically connects the sheet metal member (1015) and the mass body (1014), the damper (1010) is attached to one end of a rotary shaft (1051) of an object (1053) to be attached in a state in which the hub (1011) is inserted through a through hole (1054) in the object (1053) to be attached, the oil seal (1020) is attached in the through hole (1054) in the object (1053) to be attached in a state of inclusion of a seal lip (1024) in an annular shape which is centered about the axis (x) and a side lip (1029) in an annular shape which is centered about the axis (x) and is oriented to the damper elastic body (1016) and hermetically seals a void between the hub (1011) and the object (1053) to be attached, the hub (1011) includes a boss portion (1011a) in an annular shape which is centered about the axis (x), a rim portion (1011b) in an annular shape which is located on an outer periphery side of the boss portion (1011a), to which the sheet metal member (1015) is fixed, and which is centered about the axis (x), and a disk portion (1011c) in a disk shape which connects the boss portion (1011a) and the rim portion (1011b) and is centered about the axis (x), the damper elastic body (1016) has a protruding portion (1016c) in a cylindrical shape which protrudes toward the oil seal (1020) and is centered about the axis (x), the seal lip (1024) of the oil seal (1020) slides on the boss portion (1011a), the side lip (1029)

of the oil seal (1020) is located closer to an inner periphery side than the protruding portion (1016c) to form a labyrinth seal which is composed of a gap (g1) in an annular shape between the side lip (1029) and the protruding portion (1016c).

A tip end portion of the protruding portion (1016c) is inclined toward the inner periphery side.

The mass body (1014) has a rectangular shape in cross-section in which a length (L2) in a radial direction is larger than a length (L1) in a direction of the axis (x).

The protruding portion (1016c) and the side lip (1029) of the oil seal (1020) overlap spatially with each other.

Effects of Disclosure

According to the present disclosure, it is possible to implement a sealing structure with a damper and an oil seal capable of further improving a function of inhibiting entry of a foreign substance by inhibiting a seal lip of an oil seal from being subjected to the foreign substance entering from the damper while reducing overall weight.

DETAILED DESCRIPTION

Hereinafter, embodiments of the present disclosure will be described with reference to the drawings.

First Embodiment

Figure 1:
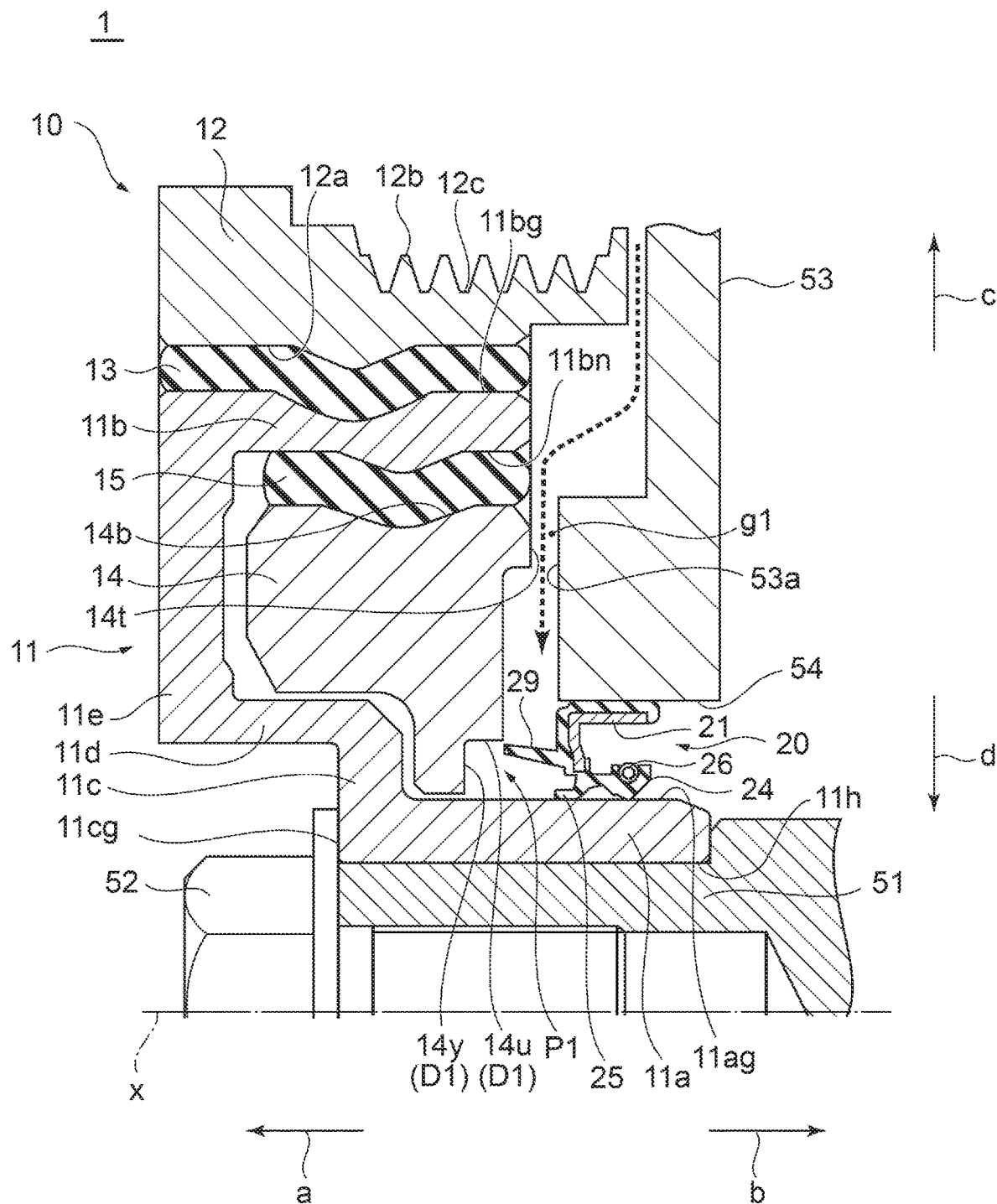
FIG. 1 is a partial sectional view in cross-section along an axis for showing a schematic configuration of a sealing structure using a damper pulley and an oil seal according to a first embodiment of the present disclosure.

FIG. 1 is a partial sectional view in cross-section along an axis for showing a schematic configuration of a sealing structure with a damper pulley and an oil seal according to a first embodiment of the present disclosure.

Hereinafter, assume, for convenience of description, that a direction of an arrow a along an axis x in FIG. 1 is an outer side and that a direction of an arrow b along the axis x is an inner side. More specifically, the outer side is a direction away from an engine, and the inner side is a direction toward the engine. Also, assume that a direction (a direction of an arrow c) away from the axis x in a direction (hereinafter also referred to as a "radial direction") perpendicular to the axis x is an outer periphery side and that a direction (a direction of an arrow d) toward the axis x in radial direction is an inner periphery side.

As shown in FIG. 1, a sealing structure 1 according to the first embodiment is one applied to an engine of an automobile. The sealing structure 1 includes a damper pulley 10 as a torsional damper and an oil seal 20.

The damper pulley 10 is fixed to one end of a crankshaft 51 as a rotary shaft with a bolt 52. The oil seal 20 is attached by press fitting to fit into a through hole 54 between a front cover 53 as an object to be attached to the engine and the damper pulley 10 and hermetically seals a void between the front cover 53 and the damper pulley 10.

The damper pulley 10 includes a hub 11, a pulley 12 as an outer-periphery-side mass body (outer mass), an outer-periphery-side damper elastic body 13 which is disposed between the hub 11 and the pulley 12, an annular ring body 14 as an inner-periphery-side mass body (inner mass), and an inner-periphery-side damper elastic body 15 which is disposed between the hub 11 and the annular ring body 14.

The hub 11 includes a boss portion 11a on the inner periphery side, a rim portion 11b on the outer periphery side, an inner-periphery-side disk portion 11c in a hollow disk shape which extends from an end portion on the outer side (the direction of the arrow a) of the boss portion 11a toward the outer periphery side (the direction of the arrow c), a cylinder portion 11d which extends from an end portion on the outer periphery side (the direction of the arrow c) of the inner-periphery-side disk portion 11c toward the outer side (the direction of the arrow a), and an outer-periphery-side disk portion 11e in a hollow disk shape which extends from an end portion on the outer side (the direction of the arrow a) of the cylinder portion 11d toward the outer periphery side (the direction of the arrow c) and connects the end portion on the outer side (the direction of the arrow a) of the cylinder portion 11d and an end portion on the outer side (the direction of the arrow a) of the rim portion 11b.

The boss portion 11a is a portion in an annular shape which has a through hole 11h and is centered about the axis x and has a smooth surface (hereinafter also referred to as an "outer peripheral surface") 11ag on the outer periphery side. The outer peripheral surface 11ag serves as a sealing surface of the oil seal 20.

The rim portion 11b is a portion in an annular shape or, more specifically, a cylindrical shape which is centered about the axis x and is a portion concentric with the boss portion 11a and located closer to the outer periphery side (the direction of the arrow c) than the boss portion 11a. The rim portion 11b has an outer peripheral surface 11bg and an inner peripheral surface 11bn in wave shapes. The outer-periphery-side damper elastic body 13 is compressively bonded to the outer peripheral surface 11bg of the rim portion 11b.

The inner-periphery-side disk portion 11c is a portion in a hollow disk shape which connects the boss portion 11a and the cylinder portion 11d, and a head of the bolt 52 is engaged with a surface (hereinafter also referred to as an "outer surface") 11cg on the outer side (the direction of the arrow a) of the inner-periphery-side disk portion 11c.

The cylinder portion 11d is a portion in a cylindrical shape which connects the inner-periphery-side disk portion 11c and the outer-periphery-side disk portion 11e. The outer-periphery-side disk portion 11e is a portion in a hollow disk shape which connects the cylinder portion 11d and the rim portion 11b and is arranged so as to face a surface (hereinafter also referred to as an "outer-side surface") 53a on the outer side of the front cover 53.

In this case, the boss portion 11a, the rim portion 11b, the inner-periphery-side disk portion 11c, the cylinder portion 11d, and the outer-periphery-side disk portion 11e of the hub 11 form a space which can store a large portion of the inner-periphery-side damper elastic body 15 and the annular ring body 14.

The pulley 12 is a metal member in an annular shape which is centered about the axis x, and gray iron (FC250, JIS G 5501:1995) or aluminum is generally used. The pulley 12 is provided on the outer periphery side of the hub 11 and covers the hub 11 from the outer periphery side. Specifically, a surface (hereinafter also referred to as an "inner peripheral surface") 12a on the inner periphery side of the pulley 12 has a wave shape corresponding to the outer peripheral surface 11bg of the rim portion 11b in the hub 11. Note that, in the damper pulley 10, the pulley 12 functions as the outer mass.

The pulley 12 is arranged such that the inner peripheral surface 12a faces the outer peripheral surface 11bg of the rim portion 11b while being at a predetermined distance from the outer peripheral surface 11bg in the radial direction (the directions of the arrows c and d). A plurality of V-shaped grooves 12c in an annular shape are formed in an outer peripheral surface 12b of the pulley 12, and a timing belt (not shown) can be wound around the outer peripheral surface 12b.

The outer-periphery-side damper elastic body 13 is provided between the pulley 12 and the rim portion 11b of the hub 11. The outer-periphery-side damper elastic body 13 is a damper rubber and is formed of a rubber-like elastic body excellent in heat resistance, cold resistance, and fatigue strength by crosslinking (vulcanization) molding. The outer-periphery-side damper elastic body 13 is press fitted in between the pulley 12 and the rim portion 11b of the hub 11 and is fixed in a state being attached to fit in between the inner peripheral surface 12a of the pulley 12 and the outer peripheral surface 11bg of the rim portion 11b.

The annular ring body 14 is a metal member in an annular shape which is centered about the axis x and is provided on the inner periphery side of the hub 11. As is the case with the pulley 12, gray iron (FC250, JIS G 5501:1995) or aluminum is generally used. The annular ring body 14 takes on a generally rectangular shape in cross-section such that the annular ring body 14 is arranged in a state of not being in contact with the hub 11 in the storage space formed by the rim portion 11b, the outer-periphery-side disk portion 11e, the cylinder portion 11d, the inner-periphery-side disk portion 11c, and the boss portion 11a in the hub 11.

Specifically, the annular ring body 14 has an outer peripheral surface 14b in a wave shape corresponding to the inner peripheral surface 11bn of the rim portion 11b in the hub 11. Note that, in the damper pulley 10, the annular ring body 14 functions as the inner mass.

A protruding portion 14t in an annular shape which protrudes so as to face the outer-side surface 53a of the front cover 53 with a gap g1 between the protruding portion 14t and the outer-side surface 53a is formed at an end portion on the outer periphery side (the direction of the arrow c) and on the inner side (the direction of the arrow b) of the annular ring body 14. In this case, the gap g1 in an annular shape between the outer-side surface 53a of the front cover 53 and the protruding portion 14t functions as a first labyrinth seal in the damper pulley 10.

A stepped portion D1 is formed at an end portion on the inner periphery side (the direction of the arrow d) and on the inner side (the direction of the arrow b) of the annular ring body 14. The stepped portion D1 is formed of a stepped portion outer peripheral surface 14u parallel to a direction of the axis x and a stepped portion bottom surface 14y along a direction perpendicular to the direction of the axis x.

The stepped portion outer peripheral surface 14u and the stepped portion bottom surface 14y of the stepped portion D1 serve as two surfaces forming a pocket P1, which is centered about the axis x and is composed of a recessed portion in an annular shape, located between the stepped portion outer peripheral and bottom surfaces 14u and 14y and the outer peripheral surface 11ag of the boss portion 11a in the hub 11. Note that although the stepped portion outer peripheral surface 14u is a surface parallel to the direction of the axis x, the stepped portion outer peripheral surface 14u is not limited to the surface. The stepped portion outer peripheral surface 14u may be a surface which decreases in diameter toward the inner side (the direction of the arrow b) at a predetermined angle.

That is, in the damper pulley 10, the pocket P1 is formed by the stepped portion outer peripheral surface 14u and the stepped portion bottom surface 14y forming the stepped portion D1 of the hub 11 and the outer peripheral surface 11ag of the boss portion 11a. Note that there is no surface-to-surface connection between the stepped portion bottom surface 14y of the stepped portion D1 and the outer peripheral surface 11ag of the boss portion 11a in a strict sense.

The inner-periphery-side damper elastic body 15 is provided between the annular ring body 14 and the rim portion 11b of the hub 11. The inner-periphery-side damper elastic body 15 is a damper rubber and is formed of a rubber-like elastic body excellent in heat resistance, cold resistance, and fatigue strength by crosslinking (vulcanization) molding, as is the case with the outer-periphery-side damper elastic body 13. The inner-periphery-side damper elastic body 15 is press fitted in a gap between the annular ring body 14 and the rim portion 11b of the hub 11 and is fixed in a state of attachment so as to fit in between the outer peripheral surface 14b of the annular ring body 14 and the inner peripheral surface 11bn of the rim portion 11b.

In the damper pulley 10, the pulley 12 as the outer mass, the outer-periphery-side damper elastic body 13, the annular ring body 14 as the inner mass, and the inner-periphery-side damper elastic body 15 form a damper portion. A natural frequency in a torsional direction (hereinafter also referred to as a "torsional natural frequency") of the damper portion is tuned so as to coincide with a torsional natural frequency of the crankshaft 51 within a predetermined frequency range where an angle of torsion of the crankshaft 51 peaks.

That is, inertial masses in a circumferential direction of the pulley 12 and the annular ring body 14 and torsional shear spring constants of the outer-periphery-side damper elastic body 13 and the inner-periphery-side damper elastic body 15 are adjusted such that the torsional natural frequency of the damper portion coincides with the torsional natural frequency of the crankshaft 51.

For this reason, the damper portion resonates by being vibrated in the torsional direction within the predetermined frequency range (rotational speed range) where a torsional amplitude of the crankshaft 51 peaks. Torque induced by a vibration displacement of the damper portion is generated in a direction opposite to a direction for torque induced by vibrations input from the crankshaft 51, which allows exertion of a dynamic vibration absorption effect.

Figure 2:
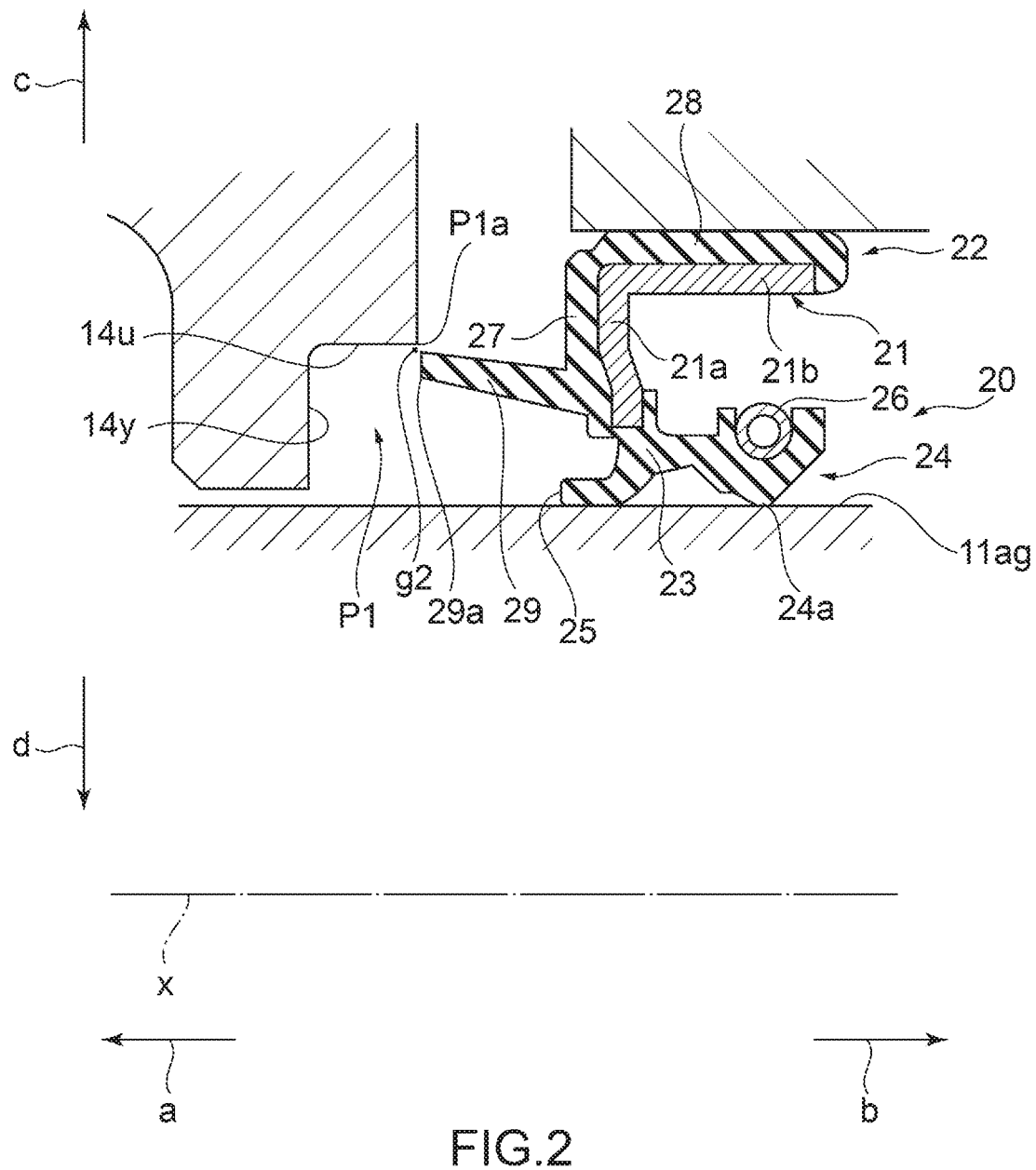
FIG. 2 is a partial enlarged view of the sealing structure using the damper pulley and the oil seal according to the first embodiment of the present disclosure.

As shown in FIG. 2, the oil seal 20 includes a metallic reinforcing ring 21 in an annular shape which is centered about the axis x and an elastic body portion 22 which is centered about the axis x and is made of an elastic body. The elastic body portion 22 is integrally attached to the reinforcing ring 21.

For example, stainless steel and SPCC (cold-rolled steel) are available for use as a metal material for the reinforcing ring 21. For example, various types of rubber materials are available for the elastic body for the elastic body portion 22. The various rubber materials include synthetic rubbers such as nitrile-butadiene rubber (NBR), hydrogenated nitrile-butadiene rubber (H-NBR), acrylic rubber (ACM), and fluororubber (FKM).

The reinforcing ring 21 is manufactured by, for example, press working or forging, and the elastic body portion 22 is molded by crosslinking (vulcanization) molding using a mold. At the time of the crosslinking molding, the reinforcing ring 21 is arranged inside the mold, the elastic body portion 22 is bonded to the reinforcing ring 21 by crosslinking (vulcanization) bonding, and the elastic body portion 22 is molded integrally with the reinforcing ring 21.

The reinforcing ring 21 takes on, for example, an L-shape in cross-section and includes a disk portion 21a and a cylinder portion 21b. The disk portion 21a is a portion in a hollow disk shape which expands in a direction perpendicular to the direction of the axis x. The cylinder portion 21b is a portion in a cylindrical shape which extends from an end portion on the outer periphery side (the direction of the arrow c) of the disk portion 21a toward the inner side (the direction of the arrow b) along the direction of the axis x.

The elastic body portion 22 is molded integrally with the reinforcing ring 21 so as to cover the reinforcing ring 21 from the outer side (the direction of the arrow a) and the outer periphery side (the direction of the arrow c). The elastic body portion 22 includes a lip waist portion 23, a seal lip 24, and a dust lip 25. The lip waist portion 23 is a portion which is located near an end portion on the inner periphery side (the direction of the arrow d) of the disk portion 21a of the reinforcing ring 21. The seal lip 24 is a portion which extends from the lip waist portion 23 toward the inner side (the direction of the arrow b) and is arranged so as to face the cylinder portion 21b of the reinforcing ring 21. The dust lip 25 extends from the lip waist portion 23 toward the axis x.

The seal lip 24 has a lip tip end portion 24a in an annular shape which has, as a cross-sectional shape, a wedge shape convex toward the inner periphery side (the direction of the arrow d) at an end portion on the inner side (the direction of the arrow b). The lip tip end portion 24a is formed to be slidably in close contact with the outer peripheral surface 11ag of the boss portion 11a in the hub 11 and hermetically seals a void between the lip tip end portion 24a and the damper pulley 10. A garter spring 26 which presses the seal lip 24 toward the inner periphery side (the direction of the arrow d) in the radial direction (the directions of the arrows c and d) is attached to fit in the outer periphery side (the direction of the arrow c) of the seal lip 24.

The dust lip 25 is a portion which extends from the lip waist portion 23 and extends toward the outer side (the direction of the arrow a) and the inner periphery side (the direction of the arrow d). A foreign substance is prevented by the dust lip 25 from entering in a direction toward the lip tip end portion 24a when in use.

The elastic body portion 22 also includes an outer-side cover 27 and a gasket portion 28. The outer-side cover 27 covers the disk portion 21a of the reinforcing ring 21 from the outer side (the direction of the arrow a). The gasket portion 28 covers the cylinder portion 21b of the reinforcing ring 21 from the outer periphery side (the direction of the arrow c).

A side lip 29 extends toward the outer side (the direction of the arrow a) and, specifically, extends parallel to the direction of the axis x or obliquely with respect to the axis x toward the outer side (the direction of the arrow a) and the outer periphery side (the direction of the arrow c).

An outer-side end 29a which is an end portion on the outer side (the direction of the arrow a) of the side lip 29 is located closer to the inner periphery side (the direction of the arrow d) than an inner-side end P1a which is an end portion on the inner side (the direction of the arrow b) of the stepped portion outer peripheral surface 14u of the stepped portion D1 forming the pocket P1 (see FIG. 1) in the radial direction (the directions of the arrows c and d) and is not inside the pocket P1 in the direction of the axis x. That is, the side lip 29 of the oil seal 20 and the stepped portion outer peripheral surface 14u of the pocket P1 are in a non-overlapping state in which the side lip 29 and the stepped portion outer peripheral surface 14u do not overlap spatially with each other in the direction of the axis x (the directions of the arrows a and b).

A gap g2 in an annular shape is formed between the outer-side end 29a of the side lip 29 and the inner-side end P1a of the stepped portion outer peripheral surface 14u forming the pocket P1. The gap g2 functions as a second labyrinth seal in the damper pulley 10.

For this reason, even if a foreign substance, such as dust, enters through the gap g1 (the first labyrinth seal) formed between the protruding portion 14t of the annular ring body 14 and the outer-side surface 53a of the front cover 53, the gap g2 (the second labyrinth seal) formed by the side lip 29 and the pocket P1 further inhibits the entering foreign substance from entering toward the seal lip 24.

Note that the side lip 29 of the oil seal 20 and the stepped portion outer peripheral surface 14u of the pocket P1 are not limited to the above-described state and may overlap in a state in which the side lip 29 and the stepped portion outer peripheral surface 14u overlap spatially with each other in the direction of the axis x (the directions of the arrows a and b). In this case, the capability of inhibiting entry of a foreign substance can be further improved. Additionally, if the stepped portion outer peripheral surface 14u decreases in diameter toward the inner side (the direction of the arrow b) at the predetermined angle, the capability of inhibiting entry of a foreign substance can be further improved by the overlapping state.

In the damper pulley 10 with the above-described configuration, the outer peripheral surface 11ag of the boss portion 11a in the hub 11, and the stepped portion outer peripheral surface 14u and the stepped portion bottom surface 14y forming the stepped portion D1 of the annular ring body 14 as three surfaces define the pocket P1. Thus, the pocket P1 need not be directly formed at the hub 11.

A conventional damper pulley of, for example, a single-mass type requires the formation of a hub pocket at a hub at the time of casting the hub and then cutting surfaces of the hub pocket for minimizing a gap between the hub pocket and the side lip 29 of the oil seal 20.

In contrast, in the damper pulley 10, the pocket P1 need not be formed in the hub 11, which is heavy, in forming the pocket P1, and it is only necessary to form the stepped portion D1 at the annular ring body 14 which is small, lightweight, and easy to handle. Thus, a manufacturing load can be reduced.

Since the pocket P1 is formed of two members using two surfaces of the annular ring body 14 and the outer peripheral surface 11ag as one surface of the boss portion 11a, in the damper pulley 10, an entirety of a space from the inner peripheral surface 11bn of the rim portion 11b to the outer peripheral surface 11ag of the boss portion 11a can be used as a space for the inner mass in which the annular ring body 14 is to be provided.

For this reason, a volume and a weight of the annular ring body 14 can be freely set inside the space. Thus, as for the damper pulley 10, the inertial mass in the circumferential direction of the annular ring body 14 can be freely adjusted such that the torsional natural frequency of the damper portion coincides with the torsional natural frequency of the crankshaft 51.

Figure 7:
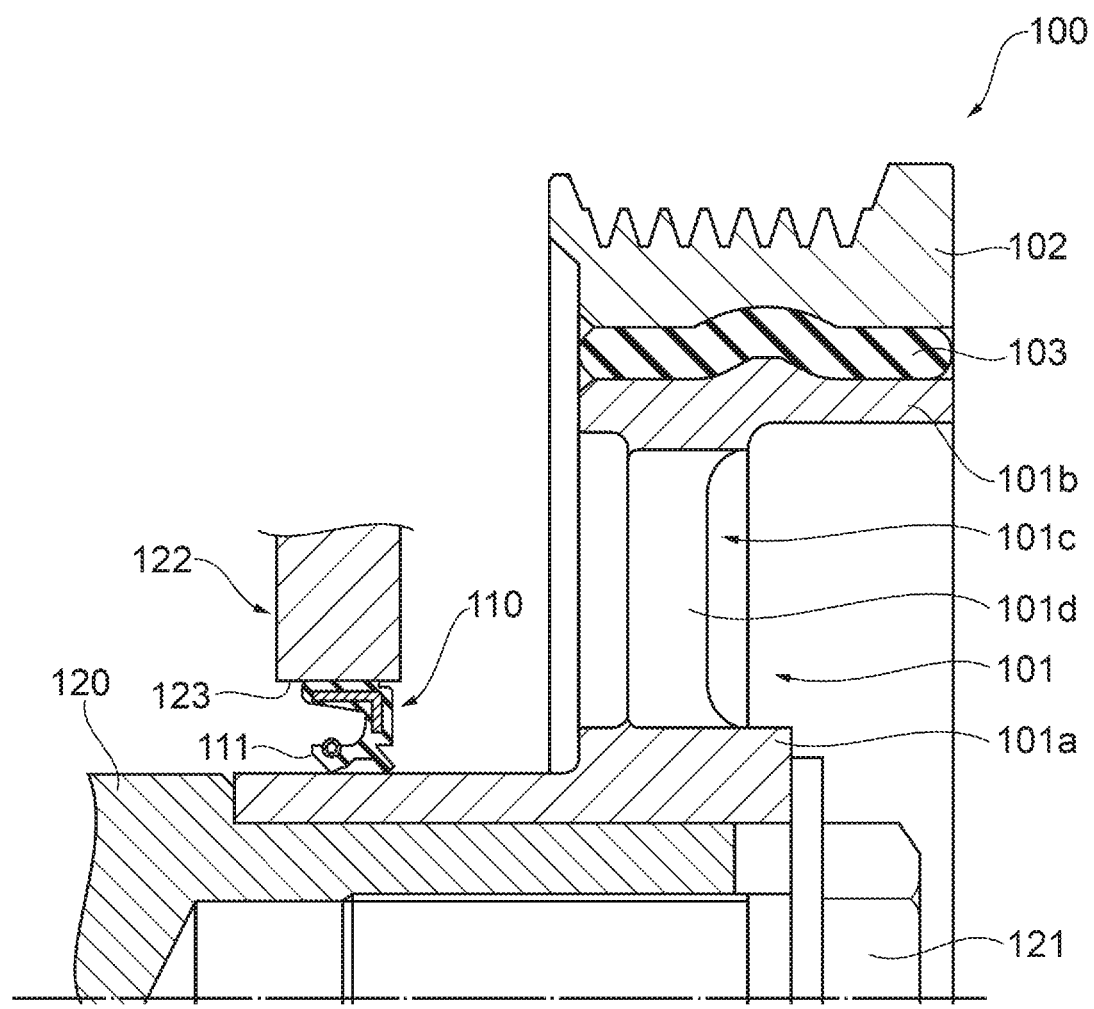
FIG. 7 is a partial sectional view in cross-section along an axis for showing a schematic configuration of a sealing structure using a conventional torsional damper of a single-mass type and an oil seal.
Figure 8:
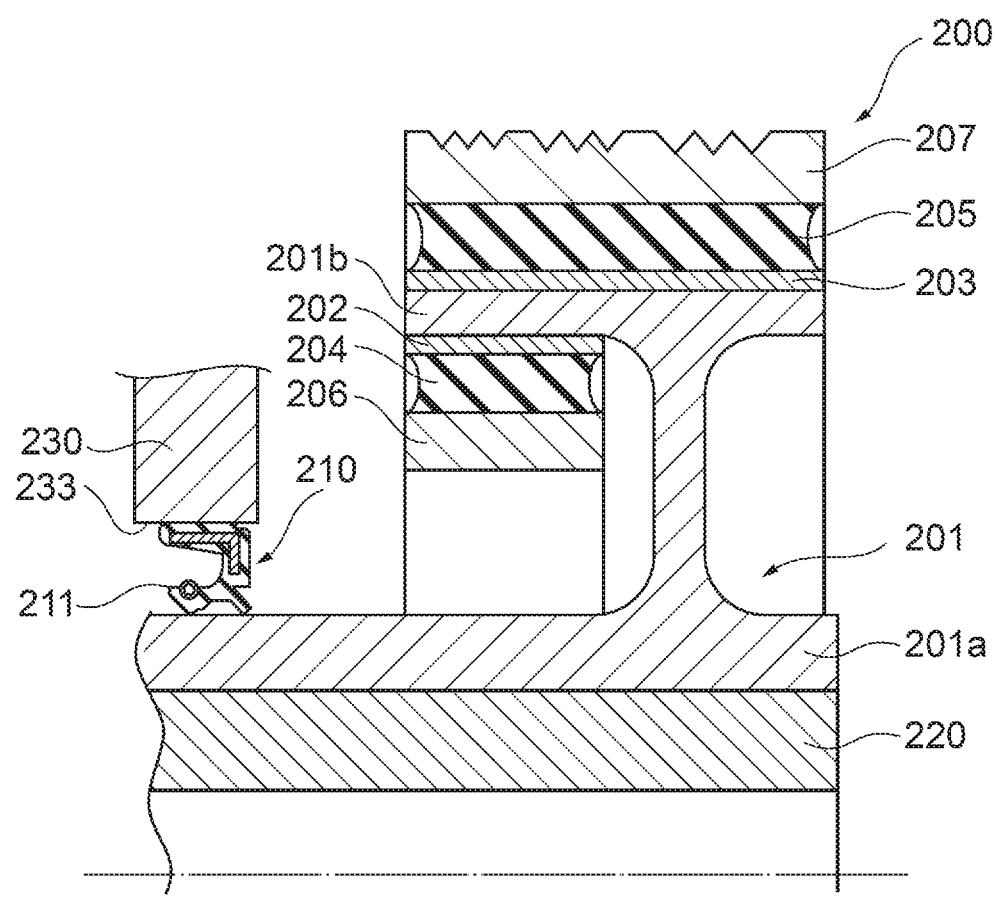
FIG. 8 is a partial sectional view in cross-section along an axis for showing a schematic configuration of a sealing structure using a conventional torsional damper of a double-mass type and an oil seal.
Figure 9:
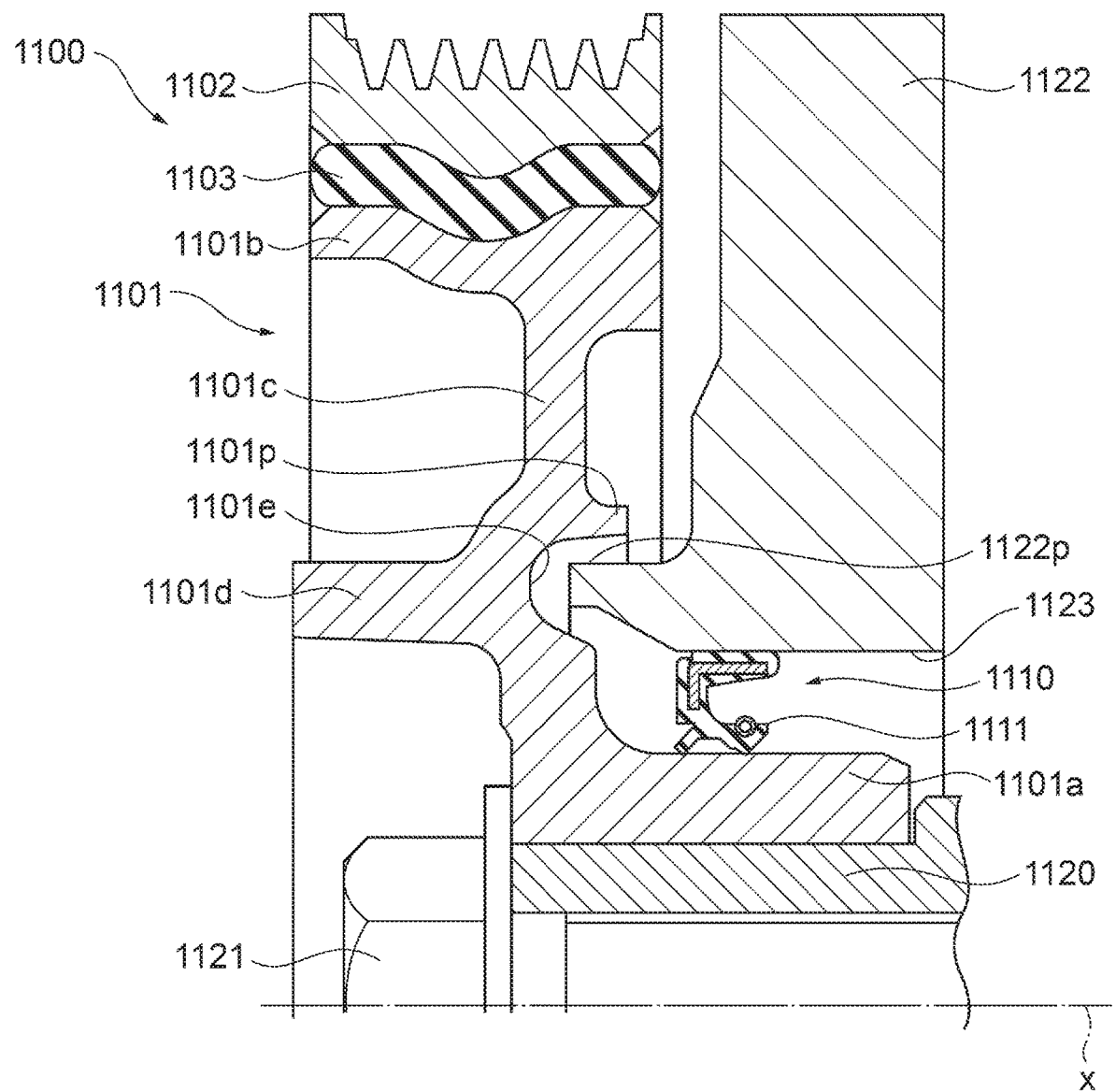
FIG. 9 is a partial sectional view in cross-section along an axis for showing a schematic configuration of a sealing structure using a conventional damper pulley and an oil seal.

Additionally, the second labyrinth seal composed of the gap g2 is formed by the pocket P1 and the side lip 29 of the oil seal 20 in the damper pulley 10 in addition to the first labyrinth seal composed of the gap g1. The damper pulley 10 is thus capable of inhibiting entry of a foreign substance to a greater degree than the conventional damper pulley 100 (FIG. 7) and the conventional damper pulley 200.

In the above-described manner, it is possible to implement the sealing structure 1 using the damper pulley 10 and the oil seal 20 capable of further improving a function of inhibiting entry of a foreign substance by inhibiting the seal lip 24 of the oil seal 20 from being subjected to a foreign substance entering from between the damper pulley 10 and the front cover 53.

Second Embodiment

Figure 3:
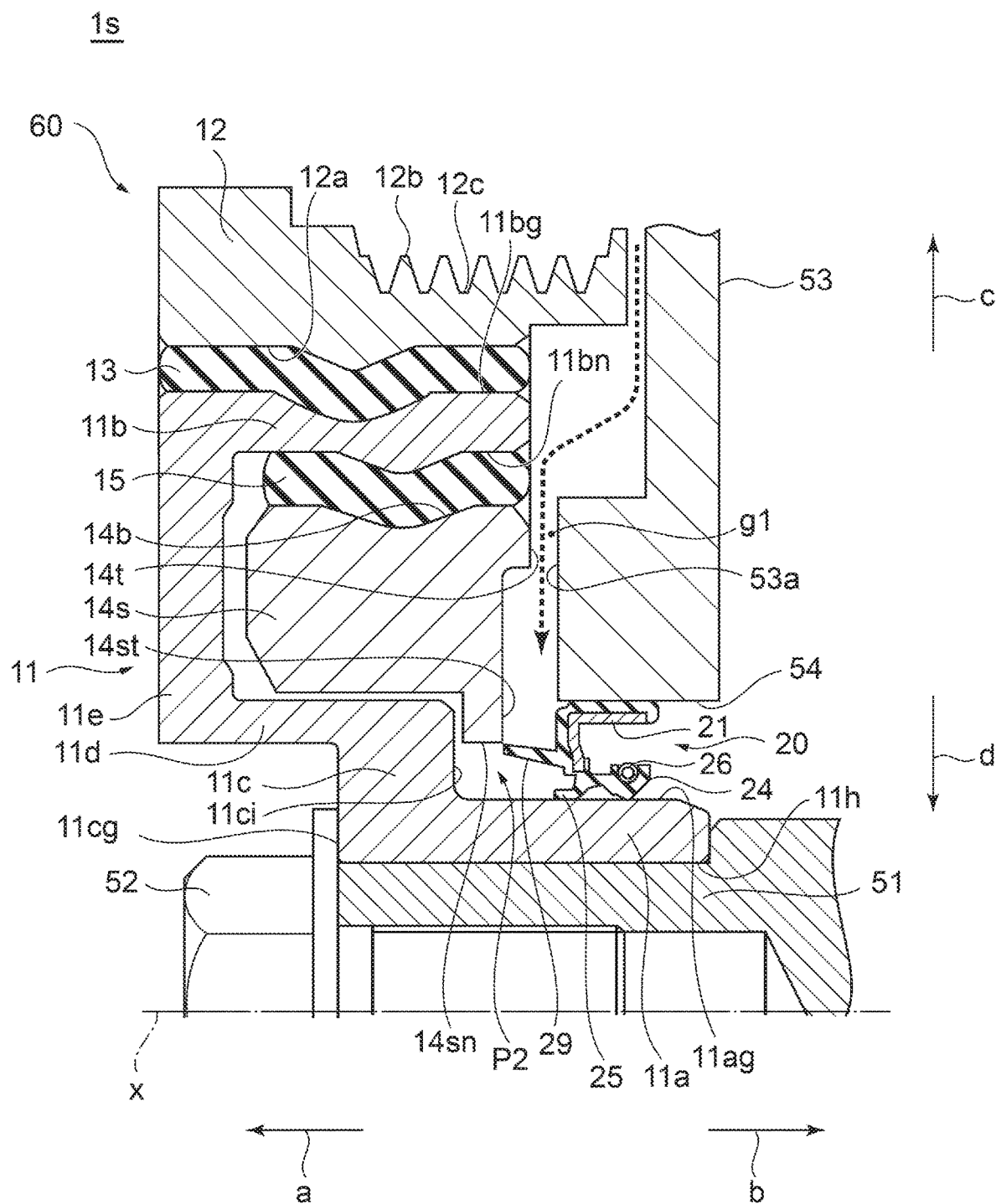
FIG. 3 is a partial sectional view in cross-section along an axis for showing a schematic configuration of a sealing structure using a damper pulley and an oil seal according to a second embodiment of the present disclosure.

FIG. 3 is a partial sectional view in cross-section along an axis for showing a schematic configuration of a sealing structure 1s using a damper pulley 60 and an oil seal 20 according to a second embodiment of the present disclosure. The damper pulley 60 of the sealing structure 1s is characterized by having a pocket P2 with a structure different from the structure of the pocket P1 according to the first embodiment, and components other than the pocket P2 are the same as the components of the damper pulley 10 according to the first embodiment. Only differences from the damper pulley 10 will be described.

In the second embodiment, the damper pulley 60 is not provided with the stepped portion D1 as in the annular ring body 14 of the damper pulley 10. A projecting portion 14st which protrudes from an end portion on an inner periphery side (a direction of an arrow d) and an inner side (a direction of an arrow b) of the annular ring body 14s toward the inner periphery side (the direction of the arrow d) is formed instead of the stepped portion D1. An inner-periphery-side end face 14sn on the inner periphery side (the direction of the arrow d) of the projecting portion 14st serves as one of the surfaces forming the pocket P2.

In this case, a side surface 11ci of the inner-periphery-side disk portion 11c is used as one of the surfaces forming the pocket P2, in addition to an outer peripheral surface 11ag of a boss portion 11a in a hub 11. That is, the pocket P2 is defined by the inner-periphery-side end face 14sn of the projecting portion 14st in the annular ring body 14s, the outer peripheral surface 11ag of the boss portion 11a in the hub 11, and the side surface 11ci of the inner-periphery-side disk portion 11c.

In this case as well, the pocket P2 and a side lip 29 of the oil seal 20 form a second labyrinth seal and can produce the same effects as the effects of the first embodiment. Additionally, the damper pulley 60 does not require formation of the stepped portion D1, unlike the annular ring body 14 according to the first embodiment, which facilitates formation of the pocket P2.

Third Embodiment

Figure 4:
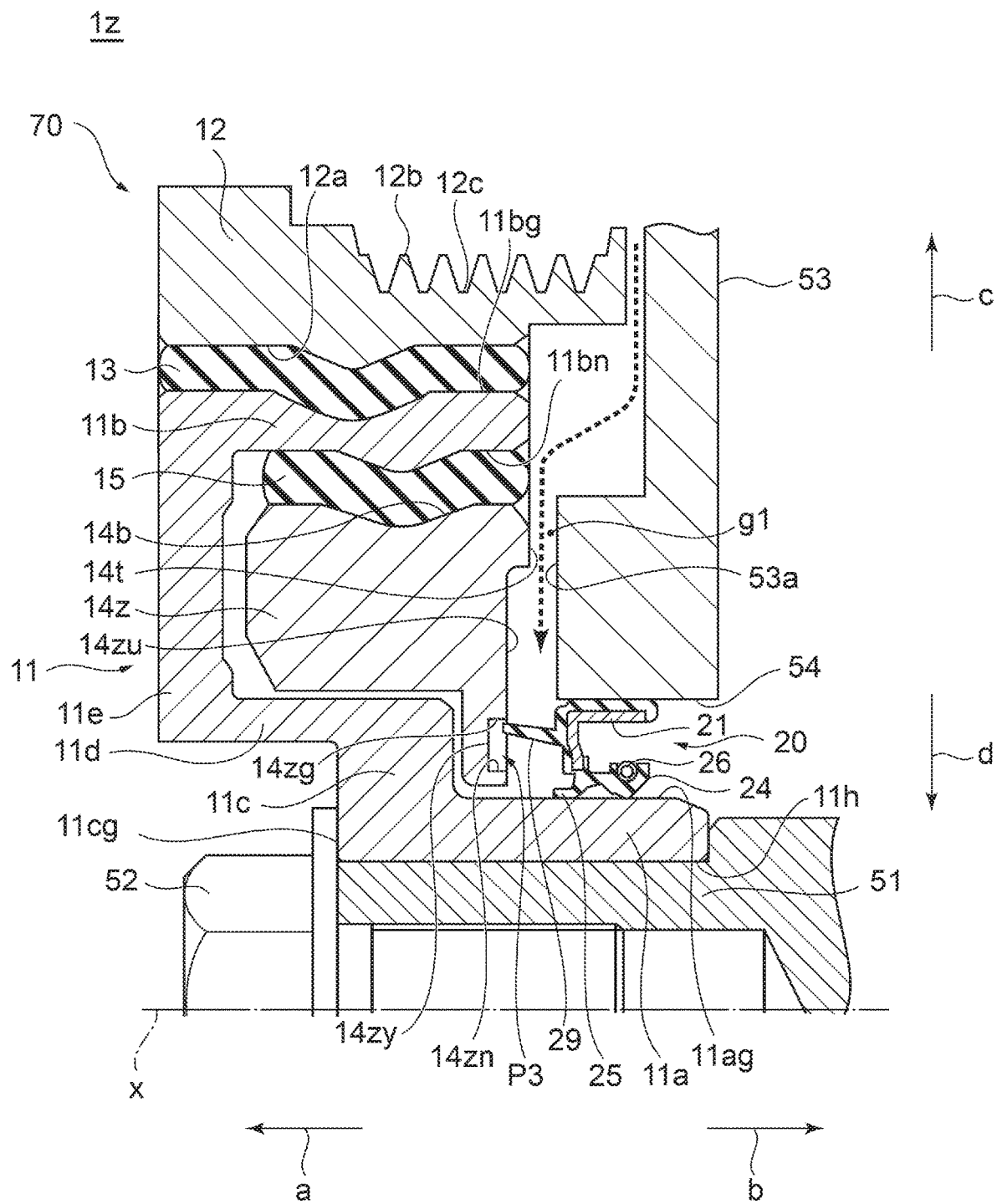
FIG. 4 is a partial sectional view in cross-section along an axis for showing a schematic configuration of a sealing structure using a damper pulley and an oil seal according to a third embodiment of the present disclosure.

FIG. 4 is a partial sectional view in cross-section along an axis for showing a schematic configuration of a sealing structure 1z using a damper pulley 70 and an oil seal 20 according to a third embodiment of the present disclosure. The damper pulley 70 of the sealing structure 1z is characterized by having a pocket P3 different in structure from the pocket P1 according to the first embodiment and the pocket P2 according to the second embodiment, and components other than the pocket P3 are the same as the components of the damper pulleys 10 and 60 according to the first and second embodiments. Only differences from the damper pulleys 10 and 60 will be described.

In the third embodiment, in the damper pulley 70, the pocket P3 in an annular shape that has a concave shape in cross-section is formed at an arbitrary portion on an inner periphery side (a direction of an arrow d) of an inner-side surface 14zu of an annular ring body 14z. As for the pocket P3, an outer peripheral surface 14zg, a bottom surface 14zy, and an inner peripheral surface 14zn forming the pocket P3 since three surfaces are all formed at the inner-side surface 14zu of the annular ring body 14z. The pocket P3 does not use an outer peripheral surface 11ag of a boss portion 11a.

In this case as well, the pocket P3 and a side lip 29 of the oil seal 20 form a second labyrinth seal and can produce the same effects as the effects of the first embodiment.

Fourth Embodiment

Figure 5:
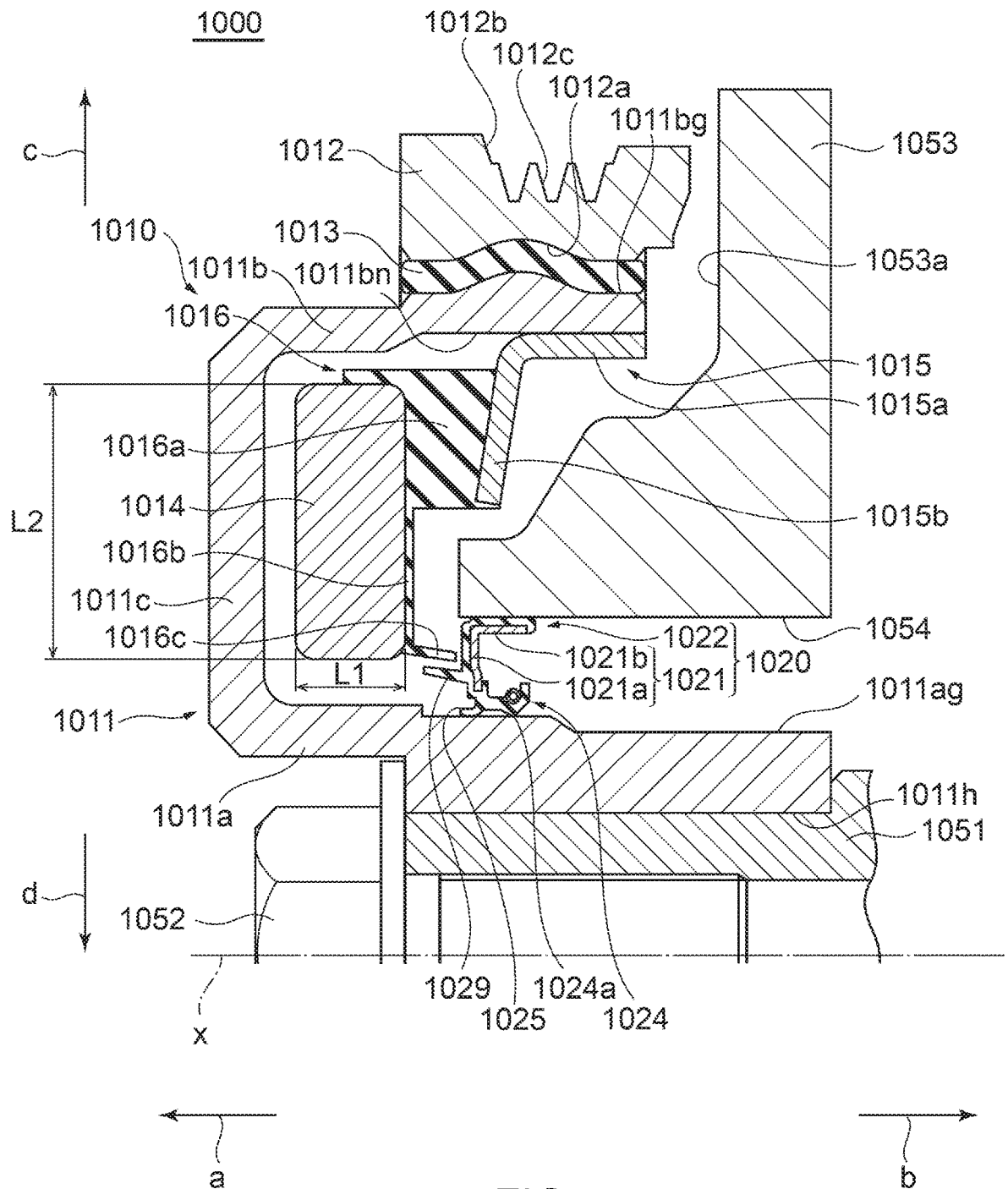
FIG. 5 a partial sectional view in cross-section along an axis for showing a schematic configuration of a sealing structure using a damper pulley and an oil seal according to a fourth embodiment of the present disclosure.

FIG. 5 is a partial sectional view in cross-section along an axis for showing a schematic configuration of a sealing structure with a damper pulley and an oil seal according to a fourth embodiment of the present disclosure.

Hereinafter, assume, for convenience of description, that a direction of an arrow a along an axis x in FIG. 5 is an outer side and that a direction of an arrow b along the axis x is an inner side. More specifically, the outer side is a direction away from an engine, and the inner side is a direction toward the engine. Also, assume that a direction (a direction of an arrow c) away from the axis x in a direction (hereinafter also referred to as a "radial direction") perpendicular to the axis x is an outer periphery side and that a direction (a direction of an arrow d) toward the axis x in a radial direction is an inner periphery side.

As shown in FIG. 5, a sealing structure 1000 according to the present embodiment is one [structure] applied to an engine of an automobile. The sealing structure 1000 includes a damper pulley 1010 as a torsional damper and an oil seal 1020.

The damper pulley 1010 is fixed to one end of a crankshaft 1051 as a rotary shaft with a bolt 1052. The oil seal 1020 is attached by press fitting to fit into a through hole 1054 between a front cover 1053 as an object to be attached of the engine and the damper pulley 1010 and hermetically seals a void between the front cover 1053 and the damper pulley 1010.

The damper pulley 1010 includes a hub 1011, a pulley 1012 as an outer-periphery-side mass body (outer mass), an outer-periphery-side damper elastic body 1013 which is disposed between the hub 1011 and the pulley 1012, a sheet metal member 1015 which is fixed integrally with the hub 1011, an inner-periphery-side damper elastic body 1016 which is fixed integrally with the sheet metal member 1015, and an annular ring body 1014 as an inner-periphery-side mass body (inner mass) which is fixed integrally with the inner-periphery-side damper elastic body 1016. Note that the inner-periphery-side damper elastic body 1016 forms a damper elastic body of the present disclosure and that the annular ring body 1014 forms a mass body of the present disclosure.

The hub 1011 includes a boss portion 1011a on the inner periphery side, a rim portion 1011b on the outer periphery side, and a disk portion 1011c in a hollow disk shape which extends from an end portion on the outer side (the direction of the arrow a) of the boss portion 1011a toward the outer periphery side (the direction of the arrow c) and connects the boss portion 1011a and the rim portion 1011b.

The boss portion 1011a is a portion in an annular shape which has a through hole 1011h and is centered about the axis x and has a smooth surface (hereinafter also referred to as an "outer peripheral surface") 1011ag on the outer periphery side. The outer peripheral surface 1011ag serves as a sealing surface of the oil seal 1020.

The rim portion 1011b is a portion in an annular shape or, more specifically, a cylindrical shape which is centered about the axis x and is a portion concentric with the boss portion 1011a and located closer to the outer periphery side (the direction of the arrow c) than the boss portion 1011a.

The rim portion 1011b has an outer peripheral surface 1011bg in a wave shape and a flat inner peripheral surface 1011bn. The outer-periphery-side damper elastic body 1013 is compressively bonded to the outer peripheral surface 1011bg of the rim portion 1011b. The sheet metal member 1015 in an annular shape that is centered about the axis x is integrally fixed to an end portion on the inner side (the direction of the arrow b) of the inner peripheral surface 1011bn of the rim portion 1011b.

The disk portion 1011c is a portion in a hollow disk shape which connects the boss portion 1011a and the rim portion 1011b and is arranged at a position spaced apart by a predetermined distance from the annular ring body 1014. In this case, the boss portion 1011a, the rim portion 1011b, and the disk portion 1011c of the hub 1011 form a space which can store the sheet metal member 1015, the inner-periphery-side damper elastic body 1016, and the annular ring body 1014.

The pulley 1012 is a metal member in an annular shape which is centered about the axis x and covers the outer periphery side of the hub 1011. Specifically, a surface (hereinafter also referred to as an "inner peripheral surface") 1012a on the inner periphery side of the pulley 1012 has a wave shape corresponding to the outer peripheral surface 1011bg of the rim portion 1011b in the hub 1011. Note that, in the damper pulley 1010, the pulley 1012 functions as the outer mass.

The pulley 1012 is arranged such that the inner peripheral surface 1012a faces the outer peripheral surface 1011bg of the rim portion 1011b while being at a predetermined distance from the outer peripheral surface 1011bg in the radial direction (the directions of the arrows c and d). A plurality of V-shaped grooves 1012c in an annular shape are formed in an outer peripheral surface 1012b of the pulley 1012, and a timing belt (not shown) can be wound around the outer peripheral surface 1012b.

The outer-periphery-side damper elastic body 1013 is provided between the pulley 1012 and the rim portion 1011b of the hub 1011. The outer-periphery-side damper elastic body 1013 is a damper rubber and is formed of a rubber-like elastic body excellent in heat resistance, cold resistance, and fatigue strength by crosslinking (vulcanization) molding. The outer-periphery-side damper elastic body 1013 is press fitted in between the pulley 1012 and the rim portion 1011b of the hub 1011 and is fixed in a state of being attached to fit in between the inner peripheral surface 1012a of the pulley 1012 and the outer peripheral surface 1011bg of the rim portion 1011b.

The sheet metal member 1015 is a thin plate-like member in an annular shape made of metal which is bent in a generally L-shape in cross-section. The sheet metal member 1015 includes a cylinder portion 1015a in a cylindrical shape which is centered about the axis x and a disk portion 1015b in a hollow disk shape which extends from an end portion on the outer side (the direction of the arrow a) of the cylinder portion 1015a toward the inner periphery side (the direction of the arrow d). In this case, the cylinder portion 1015a of the sheet metal member 1015 is fixed integrally with the inner peripheral surface 1011bn of the rim portion 1011b.

In the sheet metal member 1015, the cylinder portion 1015a and the inner peripheral surface 1011bn of the rim portion 1011b are connected. The cylinder portion 1015a and the disk portion 1015b are in a state of being not in contact with an outer-side surface 1053a of the front cover 1053.

Here, the outer-side surface 1053a of the front cover 1053 has a winding shape, and a winding flow path is formed between the sheet metal member 1015 and the outer-side surface 1053a of the front cover 1053.

The annular ring body 1014 is a metal member in an annular shape which is centered about the axis x and is provided on the inner periphery side of the hub 1011. The annular ring body 1014 takes on a generally rectangular shape in cross-section and is arranged in a state of not being in contact with the hub 1011 in the storage space formed by the rim portion 1011b, the disk portion 1011c, and the boss portion 1011a of the hub 1011.

Specifically, the annular ring body 1014 has a rectangular shape in cross-section in which a length L2 in the radial direction (the directions of the arrows c and d) is larger than a length L1 in a direction of the axis x (the directions of the arrows a and b), and each corner of the rectangular shape in cross-section is chamfered. Note that, in the damper pulley 1010, the annular ring body 1014 functions as the inner mass.

The inner-periphery-side damper elastic body 1016 is a member in an annular shape which is provided between the sheet metal member 1015 and the annular ring body 1014. The inner-periphery-side damper elastic body 1016 is a damper rubber and is formed of a rubber-like elastic body excellent in heat resistance, cold resistance, and fatigue strength by crosslinking (vulcanization) molding, like the outer-periphery-side damper elastic body 1013. The inner-periphery-side damper elastic body 1016 is fixed in a state of being integrated with the sheet metal member 1015 and the annular ring body 1014 by crosslinking (vulcanization) molding.

The inner-periphery-side damper elastic body 1016 is connected to the sheet metal member 1015 and the annular ring body 1014 but is arranged in a state of being not in contact with the rim portion 1011b, the disk portion 1011c, and the boss portion 1011a of the hub 1011 and the front cover 1053.

The inner-periphery-side damper elastic body 1016 includes a main body 1016a, an extending portion 1016b, and a protruding portion 1016c. The main body 1016a is an annular portion in a generally rectangular shape in cross-section and is a portion which connects the sheet metal member 1015 and the annular ring body 1014.

The extending portion 1016b is a portion in a hollow disk shape which extends from an end portion on the inner periphery side (the direction of the arrow d) and the outer side (the direction of the arrow a) of the main body 1016a toward the inner periphery side (the direction of the arrow d) in a layer thinner than the main body 1016a. The protruding portion 1016c is a portion in a cylindrical shape which protrudes toward the oil seal 1020 in a state of being slightly inclined from an end portion on the inner periphery side (the direction of the arrow d) of the extending portion 1016b toward the inner side (the direction of the arrow b) and the inner periphery side (the direction of the arrow d).

In the damper pulley 1010, the pulley 1012, the outer-periphery-side damper elastic body 1013, the annular ring body 1014, and the inner-periphery-side damper elastic body 1016 form a damper portion. A natural frequency in a torsional direction (hereinafter also referred to as a "torsional natural frequency") of the damper portion is tuned so as to coincide with a torsional natural frequency of a crankshaft 51 within a predetermined frequency range where an angle of torsion of the crankshaft 51 peaks.

That is, inertial masses in a circumferential direction of the pulley 1012 and the annular ring body 1014 and torsional shear spring constants of the outer-periphery-side damper elastic body 1013 and the inner-periphery-side damper elastic body 1016 are adjusted such that the torsional natural frequency of the damper portion coincides with the torsional natural frequency of the crankshaft 51. For this reason, the damper portion resonates by being vibrated in the torsional direction within the predetermined frequency range (rotational speed range) where a torsional amplitude of the crankshaft 51 peaks. Torque induced by a vibration displacement of the damper portion is generated in a direction opposite to a direction for torque induced by vibrations input from the crankshaft 51, which allows exertion of a dynamic vibration absorption effect.

Figure 6:
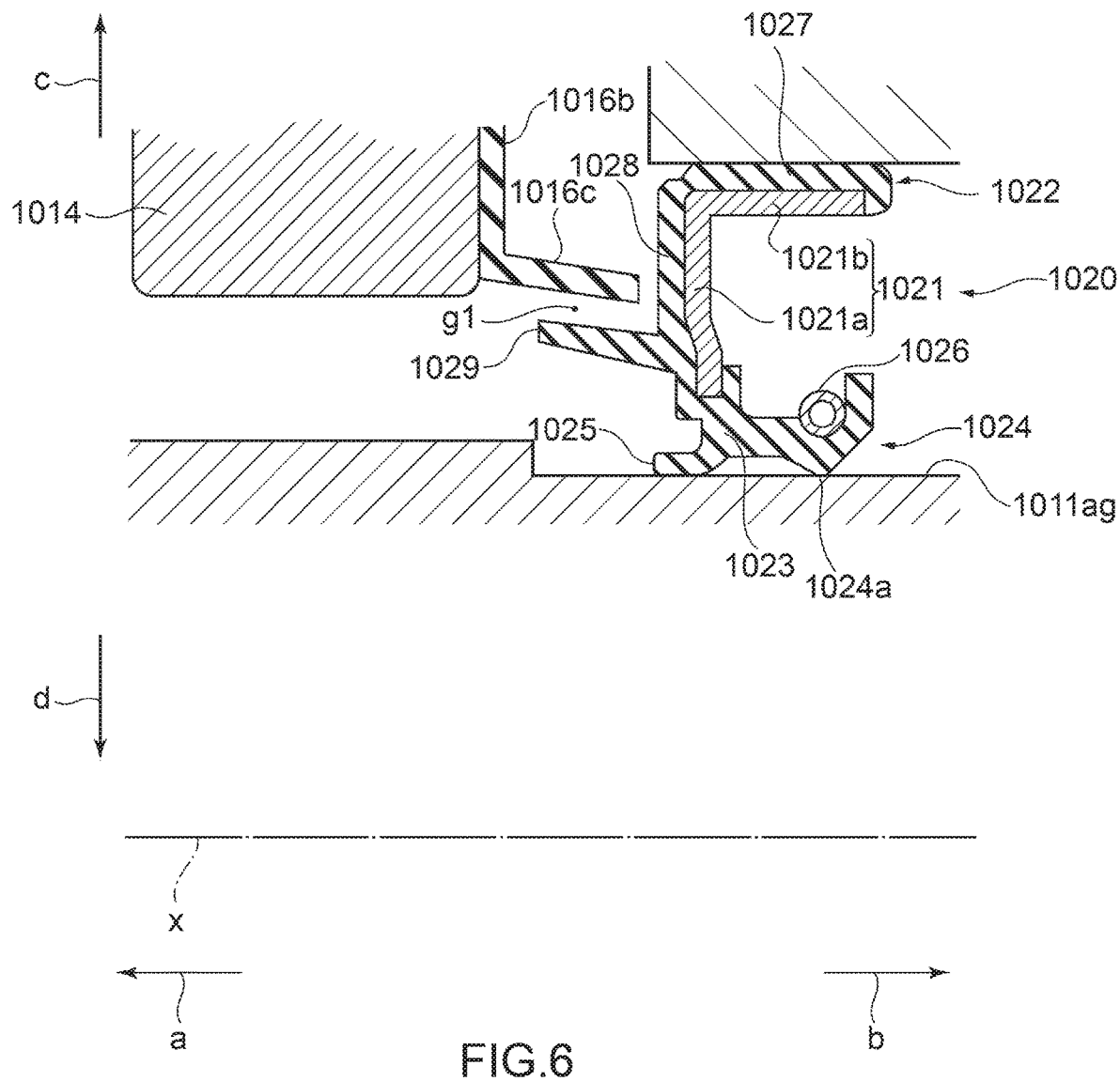
FIG. 6 is a partial enlarged view of a sealing structure using a damper pulley and an oil seal according to a fifth embodiment of the present disclosure.

As shown in FIG. 6, the oil seal 1020 includes a metallic reinforcing ring 1021 in an annular shape which is centered about the axis x and an elastic body portion 1022 which is centered about the axis x and is made of an elastic body. The elastic body portion 1022 is integrally attached to the reinforcing ring 1021. For example, stainless steel and SPCC (cold-rolled steel) are available as a metal material for the reinforcing ring 1021. For example, various types of rubber materials are available for the elastic body for the elastic body portion 1022. The various rubber materials include synthetic rubbers such as nitrile-butadiene rubber (NBR), hydrogenated nitrile-butadiene rubber (H-NBR), acrylic rubber (ACM), and fluororubber (FKM).

The reinforcing ring 1021 is manufactured by, for example, press working or forging, and the elastic body portion 1022 is molded by crosslinking (vulcanization) molding using a mold. At the time of the crosslinking molding, the reinforcing ring 1021 is arranged inside the mold, the elastic body portion 1022 is bonded to the reinforcing ring 1021 by crosslinking (vulcanization) bonding, and the elastic body portion 1022 is molded integrally with the reinforcing ring 1021.

The reinforcing ring 1021 takes on, for example, an L-shape in cross-section and includes a disk portion 1021a and a cylinder portion 1021b. The disk portion 1021a is a portion in a hollow disk shape which expands in a direction generally perpendicular to the direction of the axis x. The cylinder portion 1021b is a portion in a cylindrical shape which extends from an end portion on the outer periphery side (the direction of the arrow c) of the disk portion 1021a toward the inner side (the direction of the arrow b) in the direction of the axis x.

The elastic body portion 1022 is molded integrally with the reinforcing ring 1021 so as to cover the reinforcing ring 1021 from the outer side (the direction of the arrow a) and the outer periphery side (the direction of the arrow c). The elastic body portion 1022 includes a lip waist portion 1023, a seal lip 1024, a dust lip 1025, and a side lip 1029. The lip waist portion 1023 is a portion which is located near an end portion on the inner periphery side (the direction of the arrow d) of the disk portion 1021a of the reinforcing ring 1021. The seal lip 1024 is a portion which extends from the lip waist portion 1023 toward the inner side (the direction of the arrow b) and is arranged so as to face the cylinder portion 1021b of the reinforcing ring 1021. The dust lip 1025 extends from the lip waist portion 1023 toward the direction of the axis x.

The seal lip 1024 has a lip tip end portion 1024a in an annular shape which has, as a cross-sectional shape, a wedge shape convex toward the inner periphery side (the direction of the arrow d) at an end portion on the inner side (the direction of the arrow b). The lip tip end portion 1024a is formed to be slidably in close contact with the outer peripheral surface 1011ag of the boss portion 1011a in the hub 1011 and hermetically seals a void with the damper pulley 1010. A garter spring 1026 which presses the seal lip 1024 toward the inner periphery side (the direction of the arrow d) in the radial direction (the directions of the arrows c and d) is attached to fit in the outer periphery side (the direction of the arrow c) of the seal lip 1024.

The dust lip 1025 is a portion which extends from the lip waist portion 1023 and extends toward the outer side (the direction of the arrow a) and the inner periphery side (the direction of the arrow d). A foreign substance is prevented by the dust lip 1025 from entering in a direction of the lip tip end portion 1024a when in use.

The elastic body portion 1022 also includes an outer-side cover 1027 and a gasket portion 1028. The outer-side cover 1027 covers the disk portion 1021a of the reinforcing ring 1021 from the outer side (the direction of the arrow a). The gasket portion 1028 covers the cylinder portion 1021b of the reinforcing ring 1021 from the outer periphery side (the direction of the arrow c).

The side lip 1029 extends toward the inner-periphery-side damper elastic body 1016 on the outer side (the direction of the arrow a) and, specifically, extends parallel to the direction of the axis x or obliquely with respect to the axis x toward the outer side (the direction of the arrow a) and the outer periphery side (the direction of the arrow c).

In this case, the side lip 1029 is located closer to the inner periphery side (the direction of the arrow d) than the protruding portion 1016c of the inner-periphery-side damper elastic body 1016 and is in a state in which the side lip 1029 and the protruding portion 1016c overlap spatially with each other in the radial direction (the directions of the arrows c and d). Note that the side lip 1029 and the protruding portion 1016c of the inner-periphery-side damper elastic body 1016 are not limited to the above-described state and may be in a non-overlapping state in which the side lip 1029 and the protruding portion 1016c do not overlap spatially with each other in the radial direction (the directions of the arrows c and d).

As described above, a gap g1 in an annular shape is formed between the side lip 1029 and the protruding portion 1016c of the inner-periphery-side damper elastic body 1016. The gap g1 functions as a labyrinth seal between the damper pulley 1010 and the front cover 1053.

For this reason, even if a foreign substance such as dust enters through the flow path formed between the sheet metal member 1015 and the outer-side surface 1053a of the front cover 1053, the gap g1 (the labyrinth seal) formed by the protruding portion 1016c of the inner-periphery-side damper elastic body 1016 and the side lip 1029 of the oil seal 1020 inhibits the entering foreign substance from entering toward the seal lip 1024.

The damper pulley 1010 with the above-described configuration does not require provision of the hub-side projecting portion 1101p of the hub 1101 and the cover-side projecting portion 1122p of the front cover 1122, unlike a conventional damper pulley. A labyrinth seal structure can be constructed between the damper pulley 1010 and the side lip 1029 of the oil seal 1020 simply by forming the protruding portion 1016c integrally with the inner-periphery-side damper elastic body 1016 which is lightweight.

For this reason, the damper pulley 1010 need not use a dedicated member for constructing a labyrinth seal structure and can be made much lighter than a conventional damper pulley. The labyrinth seal structure provided between the damper pulley 1010 and the front cover 1053 and the oil seal 1020 can inhibit entry of a foreign substance to a much greater degree than a conventional damper pulley.

In the above-described manner, it is possible to implement the sealing structure 1000 using the damper pulley 1010 and the oil seal 1020 capable of further improving a function of inhibiting entry of a foreign substance by inhibiting the seal lip 1024 of the oil seal 1020 from being subjected to a foreign substance entering from between the damper pulley 1010 and the front cover 1053.

In the damper pulley 1010, a volume and a weight of the annular ring body 1014 can be freely set along the radial direction (the directions of the arrows c and d) inside a space surrounded by the boss portion 1011a, the rim portion 1011b, and the disk portion 1011c of the hub 1011. Thus, as for the damper pulley 1010, the inertial mass in the circumferential direction of the annular ring body 1014 can be freely adjusted such that the torsional natural frequency of the damper portion coincides with the torsional natural frequency of the crankshaft 1051.

Additionally, in the sealing structure 1000 using the damper pulley 1010 and the oil seal 1020, the labyrinth seal composed of the gap g1 is constructed near the oil seal 1020 closer to the inner periphery side (the direction of the arrow d) than in a conventional labyrinth structure, and an opening area of the labyrinth portion is smaller than a conventional sealing structure. This allows further improvement of a function of inhibiting entry of a foreign substance.

Other Embodiments

Note that although a case in which one of the pockets P1 to P3 is formed at a portion closer to the inner periphery side (the direction of the arrow d) of the annular ring body 14 has been described in each of the above-described first to third embodiments, the present disclosure is not limited to these cases. The pockets P1 to P3 may each be formed at a portion closer to the outer periphery side (the direction of the arrow c) of the annular ring body 14. An effect of dynamically absorbing vibrations in the torsional direction of the crankshaft 51 can be finely adjusted by changing the position of each of the pockets P1 to P3.

Although a case using the hub 11 in a shape obtained by connecting the outer-periphery-side disk portion 11e and the inner-periphery-side disk portion 11c by the cylinder portion 11d has been described in each of the first to third embodiments, the present disclosure is not limited to these cases. A hub in a shape obtained by connecting the boss portion 11a and the rim portion 11b by a single disk portion alone may be used.

Although a case using the annular ring body 1014 in a rectangular shape in cross-section in which the length L2 in the radial direction (the directions of the arrows c and d) is larger than the length L1 in the direction of the axis x (the directions of the arrows a and b) has been described in the above-described fourth embodiment, the present disclosure is not limited to the case. An annular ring body having a rectangular shape in cross-section in which the length L1 in the direction of the axis x (the directions of the arrows a and b) is larger than the length L2 in the radial direction (the directions of the arrows c and d) may be used or an annular ring body having a square shape in cross-section in which the lengths L1 and L2 are equal may be used.

Although a case including the pulley 1012 as the outer-periphery-side mass body (outer mass), the outer-periphery-side damper elastic body 1013, the sheet metal member 1015 fixed integrally with the hub 1011, the inner-periphery-side damper elastic body 1016 fixed integrally with the sheet metal member 1015, and the annular ring body 1014 as the inner-periphery-side mass body (inner mass) has been described in the fourth embodiment, the present disclosure is not limited to this case. If torsional vibrations induced by rotational fluctuations of the crankshaft 51 can be reduced simply by the annular ring body 1014 as the inner-periphery-side mass body (inner mass), only the annular ring body 1014 may be included as a mass body without including the pulley 1012 as the outer-periphery-side mass body and the outer-periphery-side damper elastic body 1013.

The preferred embodiments of the present disclosure have been described above. The present disclosure is not limited to the sealing structure 1 according to the above-described embodiment and includes all aspects included in the concept of the present disclosure and the claims for the patent. Components may be appropriately and selectively combined so as to solve at least a part of the above-described problems and exert at least a part of the above-described effects. For example, the shape, the material, the arrangement, the size, and the like of each component in the embodiments can be appropriately changed depending on a specific use mode of the present disclosure.

What is claimed is:

1. A sealing structure with a damper and an oil seal, wherein
the damper includes a hub, an outer-periphery-side mass body in an annular shape which is provided on an outer periphery side of the hub and is centered about an axis, an outer-periphery-side damper elastic body which is disposed between the hub and the outer-periphery-side mass body and elastically connects the hub and the outer-periphery-side mass body, an inner-periphery-side mass body in an annular shape which is provided on an inner periphery side of the hub and is centered about the axis, and an inner-periphery-side damper elastic body which is disposed between the hub and the inner-periphery-side mass body and elastically connects the hub and the inner-periphery-side mass body, the damper is attached to one end of a rotary shaft of an object to be attached in a state in which the hub is inserted through a through hole in the object to be attached, the oil seal is attached in the through hole in the object to be attached in a state of inclusion of a seal lip in an annular shape which is centered about the axis and a side lip in an annular shape which is centered about the axis and is oriented to the inner-periphery-side mass body and seals between the hub and the object to be attached, the hub includes a boss portion in an annular shape which is centered about the axis, a rim portion in an annular shape which is located on the outer periphery side of the boss portion and is centered about the axis, and a disk portion in a disk shape which connects the boss portion and the rim portion and is centered about the axis, the outer-periphery-side mass body is attached to an outer peripheral surface of the rim portion via the outer-periphery-side damper elastic body, the inner-periphery-side mass body is attached to an inner peripheral surface of the rim portion via the inner-periphery-side damper elastic body, the inner-periphery-side mass body forms at least a part or a whole of a pocket which includes a recessed portion in an annular shape centered about the axis, and the seal lip of the oil seal slides on the boss portion, and the side lip of the oil seal extends toward the pocket to form a labyrinth seal which includes a gap in an annular shape between the side lip and the pocket.

2. The sealing structure with the damper and the oil seal according to claim 1, wherein
the pocket of the inner-periphery-side mass body is defined by two surfaces of the inner-periphery-side mass body and an outer peripheral surface of the boss portion.

3. The sealing structure with the damper and the oil seal according to claim 1, wherein
the pocket is defined by one surface of the inner-periphery-side mass body, an outer peripheral surface of the boss portion, and a side surface of the disk portion.

4. The sealing structure according to claim 1, wherein
the pocket and the side lip of the oil seal overlap spatially with each other.

* * * * *